(12) United States Patent
Kim (10) Patent No.: US 11,452,582 B2
(45) Date of Patent: Sep. 27, 2022

(54) SELF-LIGATING ORTHODONTIC BRACKET ASSEMBLY

(71) Applicant: GNI CO., LTD., Hwaseong-si (KR)

(72) Inventor: Dug Su Kim, Hwaseong-si (KR)

(73) Assignee: GNI CO., LTD., Hwaseong-si (KR)

( * ) Notice: Subject to any disclaimer, the term of this patent is extended or adjusted under 35 U.S.C. 154(b) by 140 days.

(21) Appl. No.: 17/064,827

(22) Filed: Oct. 7, 2020

(65) Prior Publication Data

US 2021/0346129 A1 Nov. 11, 2021

(30) Foreign Application Priority Data

May 8, 2020 (KR) ......................... 10-2020-0054830

(51) Int. Cl.
*A61C 7/28* (2006.01)

(52) U.S. Cl.
CPC .................................... *A61C 7/287* (2013.01)

(58) Field of Classification Search
CPC .. A61C 7/287; A61C 7/12; A61C 7/14; A61C 7/16; A61C 7/143; A61C 7/00
See application file for complete search history.

(56) References Cited

U.S. PATENT DOCUMENTS

| | | | | |
|---|---|---|---|---|
| 6,247,923 B1 * | 6/2001 | Vashi | ....................... | A61C 7/30 433/10 |
| 7,704,072 B2 * | 4/2010 | Damon | ................... | A61C 7/287 433/11 |
| 9,770,310 B2 | 9/2017 | Hirsch | | |
| 2008/0020338 A1 * | 1/2008 | Zakhem | ................... | A61C 7/28 433/9 |
| 2009/0017413 A1 * | 1/2009 | Roman | ..................... | A61C 7/16 433/10 |
| 2010/0055637 A1 * | 3/2010 | Rodriguez | ............... | A61C 7/30 264/16 |

(Continued)

FOREIGN PATENT DOCUMENTS

| | | |
|---|---|---|
| CN | 104902842 A | 9/2015 |
| JP | 5123570 B2 | 1/2013 |
| KR | 10-2011-0117660 A | 10/2011 |

(Continued)

*Primary Examiner* — Cris L. Rodriguez
*Assistant Examiner* — Sydney J Pulvidente
(74) *Attorney, Agent, or Firm* — KORUS Patent, LLC; Seong Il Jeong (57) ABSTRACT

Disclosed herein is a self-ligating orthodontic bracket assembly. The self-ligating orthodontic bracket assembly includes: a body block including a base, a pair of guide walls, and a stopper wall in an integrated manner; a ligating block configured to be slidably coupled to the sliding portion so that the archwire slidably inserted and seated into the seating groove is selectively ligated and released in a seated state, and provided with a fitting depression formed by recessing the bottom of the ligating block upward and a guide depression formed through upward recessing to form a step at a location away from one end of the fitting depression; and a ligating means including a temporary assembly protrusion and a complete assembly protrusion successively formed on the sliding portion, and a retainer configured to selectively ligate and release the archwire in cooperation with the temporary assembly protrusion and the complete assembly protrusion.

3 Claims, 7 Drawing Sheets

(56) References Cited

U.S. PATENT DOCUMENTS

2014/0205960 A1\* 7/2014 Farzin-Nia ............... A61C 7/20
433/10
2017/0245963 A1\* 8/2017 Hirsch ..................... A61C 7/34

FOREIGN PATENT DOCUMENTS

| KR | 20-2012-0003694 U | 5/2012 |
| --- | --- | --- |
| KR | 10-2012-0110982 A | 10/2012 |
| KR | 10-1489625 B1 | 2/2015 |
| KR | 10-2015-0031948 A | 3/2015 |
| KR | 10-2015-0106403 A | 9/2015 |
| KR | 10-1701256 B1 | 2/2017 |
| KR | 10-1728904 B1 | 4/2017 |
| KR | 10-2018-0107469 A | 10/2018 |
| KR | 10-2019-0008708 A | 1/2019 |

\* cited by examiner

SELF-LIGATING ORTHODONTIC BRACKET ASSEMBLY

CROSS-REFERENCE TO RELATED APPLICATION

This application claims the benefit of Korean Patent Application No. 10-2020-0054830 filed on May 8, 2020, which is hereby incorporated by reference herein in its entirety.

BACKGROUND

1. Technical Field

The present invention relates generally to a self-ligating orthodontic bracket assembly, and more particularly to an orthodontic bracket assembly in which ligation is easily achieved and ligation can be performed again after the easy release of ligation when adjustment is required, and in which an optimal amount of resin is sufficiently interposed between the base of a body block and the surface of a tooth in a uniform distribution, so that the orthodontic bracket assembly can be securely and reliably attached to a tooth.

2. Description of the Related Art

Malocclusion is a condition in which the teeth of the lower and upper jaws are not straight or interlocked normally. Malocclusion is not desirable in appearance, functionally interferes with the chewing of food, and negatively affects pronunciation. Furthermore, if malocclusion is left untreated, tooth decay or gum disease may occur, and other parts of the body may be adversely affected, thereby causing or exacerbating various diseases.

Orthodontics is used for the treatment of the above-described malocclusion. Orthodontics refers to an orthodontic method of correcting the arrangement of teeth by gradually moving the teeth to a desired position by applying a constant force to regularly arranged teeth using an orthodontic brace. The orthodontic brace includes brackets directly attached to the surfaces of teeth, and archwires that are coupled to the brackets to provide a predetermined pressure or tension to the teeth. For orthodontics, the pressure and tension applied to the archwire and their directions may be adjusted in various manners. The target tooth can be gradually moved according to the pressure, the tension and the directions adjusted and provided.

Figure 1:
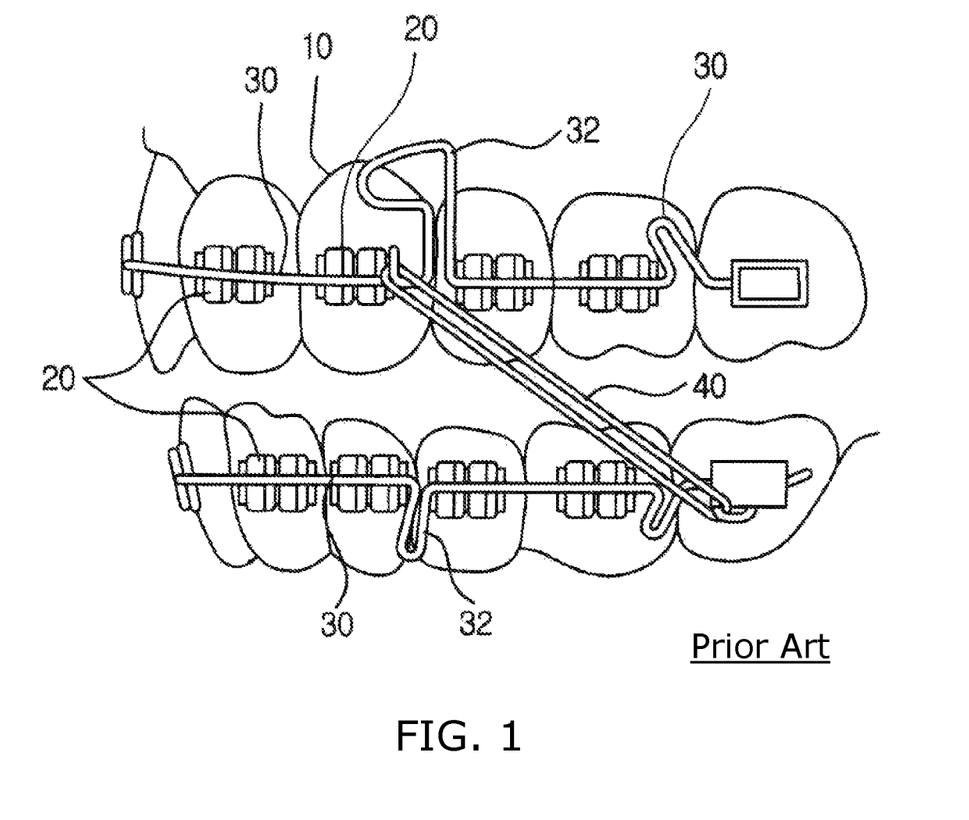
FIG. 1 is a conceptual diagram illustrating a typical orthodontic treatment method.

FIG. 1 is a conceptual diagram illustrating a typical orthodontic method, which shows an overall orthodontic method. Referring to FIG. 1, the common orthodontic method used today will be described as follows:

First, a bracket 20 is attached to the surface of a target tooth 10, which is an object of orthodontic teeth, based on the target tooth 10.

Such brackets 20 are connected by an archwire 30. In order to provide a continuous tension to the target tooth 10, an elastic portion 32 is formed on the archwire 30, or the direction of tension is provided using a rubber band 40.

Furthermore, elastic portions 32 may be formed by bending a portion of the archwire 30 in various shapes such as U-, P-, R-forms, etc. The position of the tooth 10 may be moved by forming a fine tension or torsion between a fixed point and the tooth 10, and it is utilized to change the posture of the tooth 10.

Meanwhile, during orthodontic treatment, the archwire 30 is connected to the fixed point, and the bracket 20 and the tooth 10 are finely moved by the archwire 30 that provides a predetermined pressure and tension.

In this case, the tissue of the bone surrounding the tooth 10 in the direction in which the tooth 10 moves is gradually absorbed, and then new bone tissue is formed on the opposite side to fill the empty space.

In this way, the process of the destruction and generation of bone cells is repeated, and in this process, as the target tooth 10 is moved finely, the correction of the tooth is made gradually.

Since the orthodontic treatment performed using the above-described orthodontic method involves biological treatment as described above, it is known that the treatment period generally requires a long time, and generally requires around two years.

Meanwhile, although the orthodontic treatment requires a long time as described above, the bracket 20 attached to the surface of the target tooth is exposed to the outside when talking with another person. Accordingly, conventional metal brackets are gradually disappearing, and brackets made of a transparent material are preferred.

Recently, there has been introduced a self-ligating orthodontic bracket that covers an archwire from the top during an orthodontic process so that it is not observed from the outside.

Although the above-described bracket has the advantage of giving aesthetic satisfaction because the archwire is not easily observed from the outside, it is problematic in that it is difficult to easily manipulate the archwire when the position of the archwire is changed, the tensile force of the archwire is changed, or when the archwire needs to be handled according to another need, depending on the orthodontic state of the tooth. Therefore, there is a demand for research into and development of a self-ligated orthodontic bracket assembly that facilitates the ligation of an archwire, allows ligation to be performed again after the convenient release of a ligation state when the initial ligation or adjustment of the archwire is requested, and, through this, further improves the efficiency of orthodontic treatment and procedure.

Meanwhile, the self-ligation orthodontic bracket assembly should not be easily separated from the surface of a tooth while performing orthodontic treatment. In addition, after the completion of the orthodontic treatment, the orthodontic bracket assembly should be able to be easily separated from the surface of the tooth without damage to the surface of the tooth. In order for the orthodontic bracket assembly to be desirably attached to the surface of a tooth during orthodontic treatment, an optimum amount of adhesive resin should be interposed between the base of the body block of the orthodontic bracket assembly and the surface of the tooth in a uniform distribution. In order to obtain a sufficient adhesion force between the base and the surface of a tooth, there has been previously proposed a technology in which protrusions in a regular pattern are formed on the bottom surface of the base. In the conventional technology, the protrusions have adhesion surfaces corresponding to the surface of the tooth. Furthermore, recessed portions under the protrusions allow resin to be interposed between themselves and the teeth in larger thicknesses. However, the protrusions have different adhesion conditions for the surface of a tooth depending on their locations. It is difficult to satisfy various adhesion conditions or various adhesion environments because all of the shapes are constant. In addition, it is preferable that the surface of the tooth is not damaged when the bracket assembly is separated from the surface of the tooth. By the way, conventionally, the periphery of the bottom of the base can be desirably separated from the surface of the tooth without damage to the surface of the tooth. In contrast, in the central area of the base, strongly compressed resin is not easily detached from the surface of the tooth. Therefore, there are many cases in which the surface of the tooth surface is damaged by forcibly removing the above resin.

PRIOR ART DOCUMENTS

Patent document 1: Korean Patent Application Publication No. 10-2012-110982 (published on Oct. 10, 2012)
Patent document 2: Korean Patent Application Publication No. 10-2015-106403 (published on Sep. 21, 2015)
Patent document 3: Korean Patent Application Publication No. 10-2019-0008708 (published on Jan. 25, 2019)

SUMMARY

Accordingly, an object of the present invention is to provide an orthodontic bracket assembly that facilitates ligation and allows an optimal amount of resin to be sufficiently interposed between the base of a body block and the surface of a tooth in a uniform distribution, so that the orthodontic bracket assembly can be securely and reliably attached to a tooth and also be separated from the surface of the tooth without damage to the surface of the tooth.

According to an aspect of the present invention, there is provided a self-ligating orthodontic bracket assembly, the self-ligating orthodontic bracket assembly being attached to a surface of a tooth by resin and selectively ligating or releasing an archwire, the self-ligating orthodontic bracket assembly including: a body block including, in an integrated manner, a base provided with a bottom surface having a curved surface shape corresponding to a surface of a tooth, a pair of guide walls provided on left and right sides of a front portion of an area above the base so that a depressed sliding portion in which a seating groove configured such that an archwire is seated therein is formed is formed in the front portion of the area above the base, and a stopper wall formed in a rear portion of the area above the base and configured to finish the sliding portion; a ligating block configured to be slidably coupled to the sliding portion so that the archwire slidably inserted and seated into the seating groove is selectively ligated and released in a seated state, and provided with a fitting depression formed by recessing the bottom of the ligating block upward and a guide depression formed through upward recessing to form a step at a location a predetermined distance away from one end of the fitting depression; and a ligating means including a temporary assembly protrusion and a complete assembly protrusion successively formed on the sliding portion, and a retainer configured to selectively ligate and release the archwire in cooperation with the temporary assembly protrusion and the complete assembly protrusion; wherein the retainer is formed in a shape of a hollow square plate in which a fastening hole is formed in a center thereof, a stopper piece on one side of the fastening hole is configured to be fitted and fastened into the fitting depression, and a stop flexible pieces on an opposite side of the fastening hole is divided into a pair of pieces by a dividing hole in a middle of the stop flexible pieces; wherein, when the ligating block slides and proceeds on the sliding portion, the stop flexible pieces are sequentially moved over the temporary assembly protrusion and the complete assembly protrusion while being elastically deformed and returned toward the guide depression; and wherein a bottom surface of the base includes an edge portion, a central recessed portion formed in a center of an area inside the edge portion, a peripheral recessed portion formed in a peripheral portion of the area inside the edge portion and configured to form a double step structure along with the central recessed portion, and a plurality of adhesion protrusions protruding from a bottom of the central recessed portion or a bottom of the peripheral recessed portion, the plurality of adhesion protrusions include one or more cross-shaped adhesion protrusions where four straight portions meet approximately 90 degrees, one or more T-shaped adhesion protrusions where three straight portions meet at approximately 90 degrees, and one or more L-shaped adhesion protrusions where two straight portions meet at approximately 90 degrees; and a depth of recession of the central recessed portion is larger than that of the peripheral recessed portion so that with respect to resin between the bottom surface of the base and the surface of the tooth, resin in a central region is less compressed than resin in a peripheral region.

The self-ligating orthodontic bracket assembly may further include an adhesive film attached to a bottom surface of the ligating block while covering the retainer and configured to attach and maintain the retainer to the bottom surface of the ligating block until the ligation block is slidably coupled to the sliding portion, and a cutting edge configured to cut the adhesive film in a longitudinal direction thereof when the ligating block to which the retainer is coupled slides on the sliding portion is formed on the sliding portion.

An inner cross corner and an outer cross corner may be formed in an area where two straight portions meet in the cross-shaped adhesion protrusions, the T-shaped adhesion protrusions, and the L-shaped adhesion protrusions, resin inlet holes may be formed in the bottom surfaces of the cross-shaped adhesion protrusions, the T-shaped adhesion protrusions and the L-shaped adhesion protrusions and extend to a resin outlet hole that is formed adjacent to a point where the inner cross corner and the bottom of the central or peripheral recessed portion meet, and a resin outflow/inflow passage may be formed in the edge portion to extend from the outer surface of the edge portion to the inner surface of the edge portion.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

A self-ligating orthodontic bracket assembly according to an embodiment of the present invention will be described in detail below with reference to the accompanying drawings.

Figure 2:
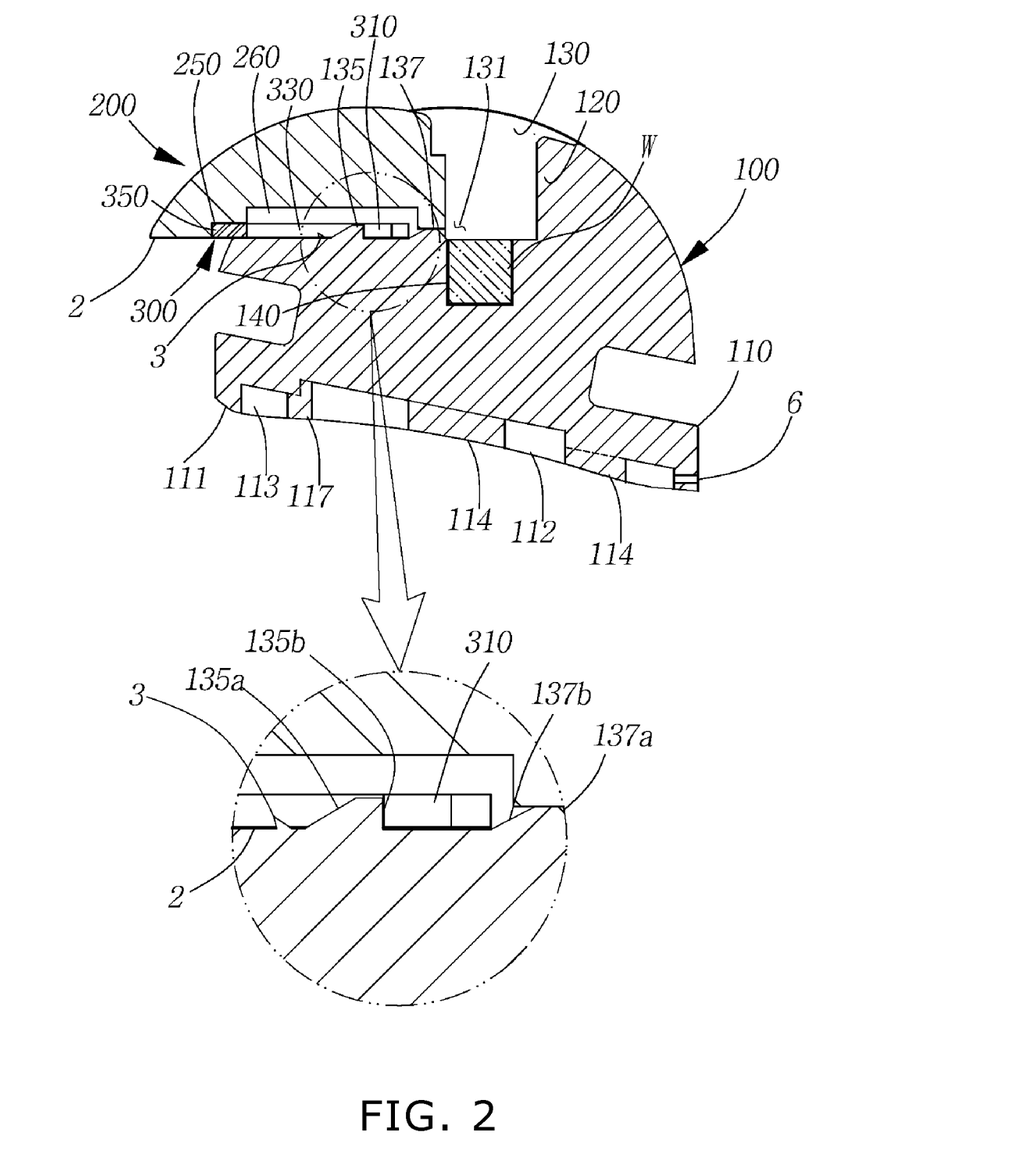
FIG. 2 is a sectional view showing a state in which the self-ligation of a self-ligating orthodontic bracket assembly according to an embodiment of the present invention is being performed.
Figure 3:
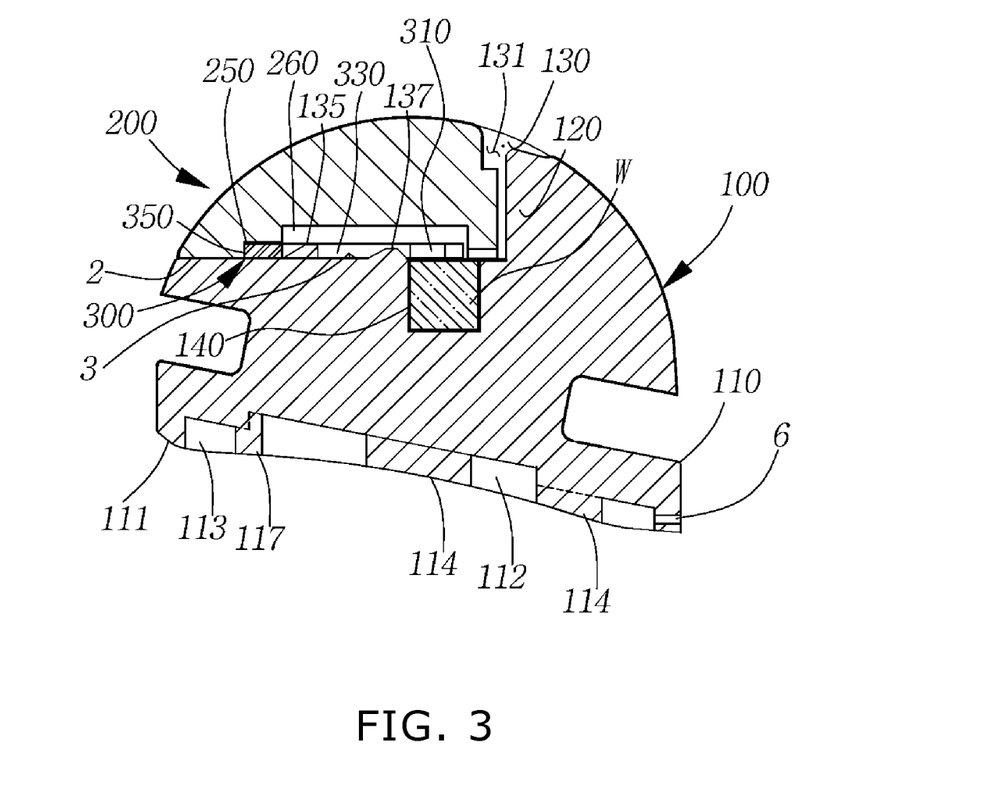
FIG. 3 is a sectional view showing a state in which the self-ligation of the self-ligating orthodontic bracket assembly according to the embodiment of the present invention has been completed.
Figure 4:
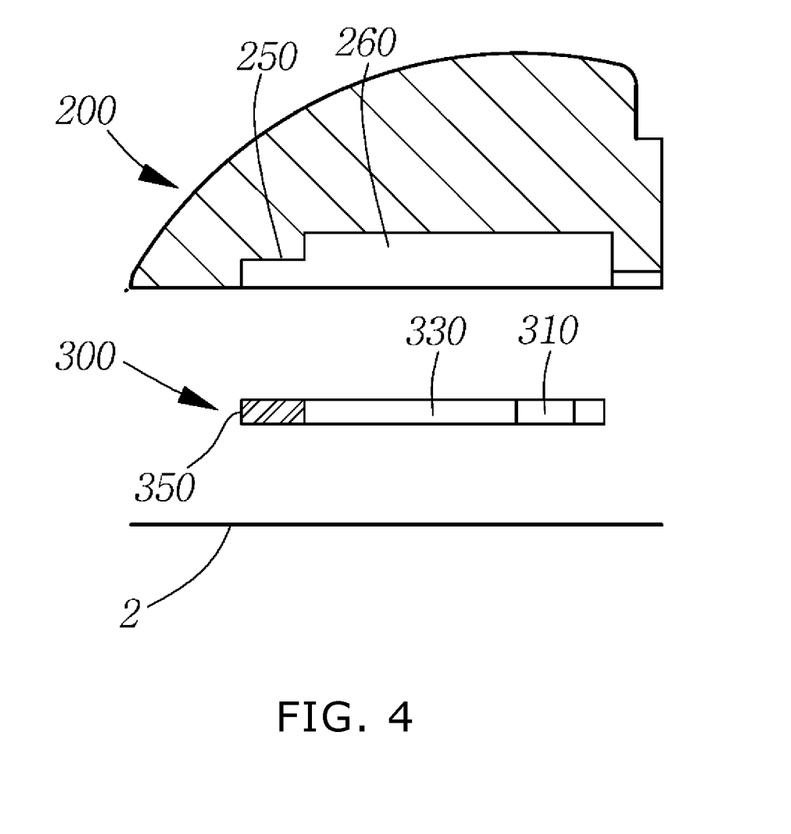
FIG. 4 is an exploded view showing a ligating block and a retainer separated from the self-ligating orthodontic bracket assembly.
Figure 5:
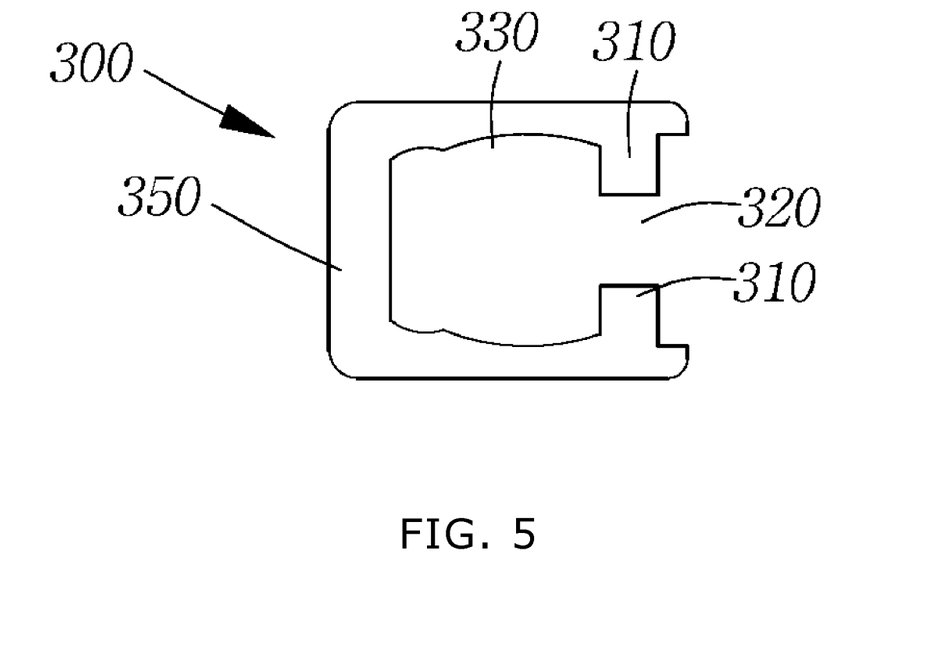
FIG. 5 is a plan view of the retainer shown in FIG. 4.
Figure 6:
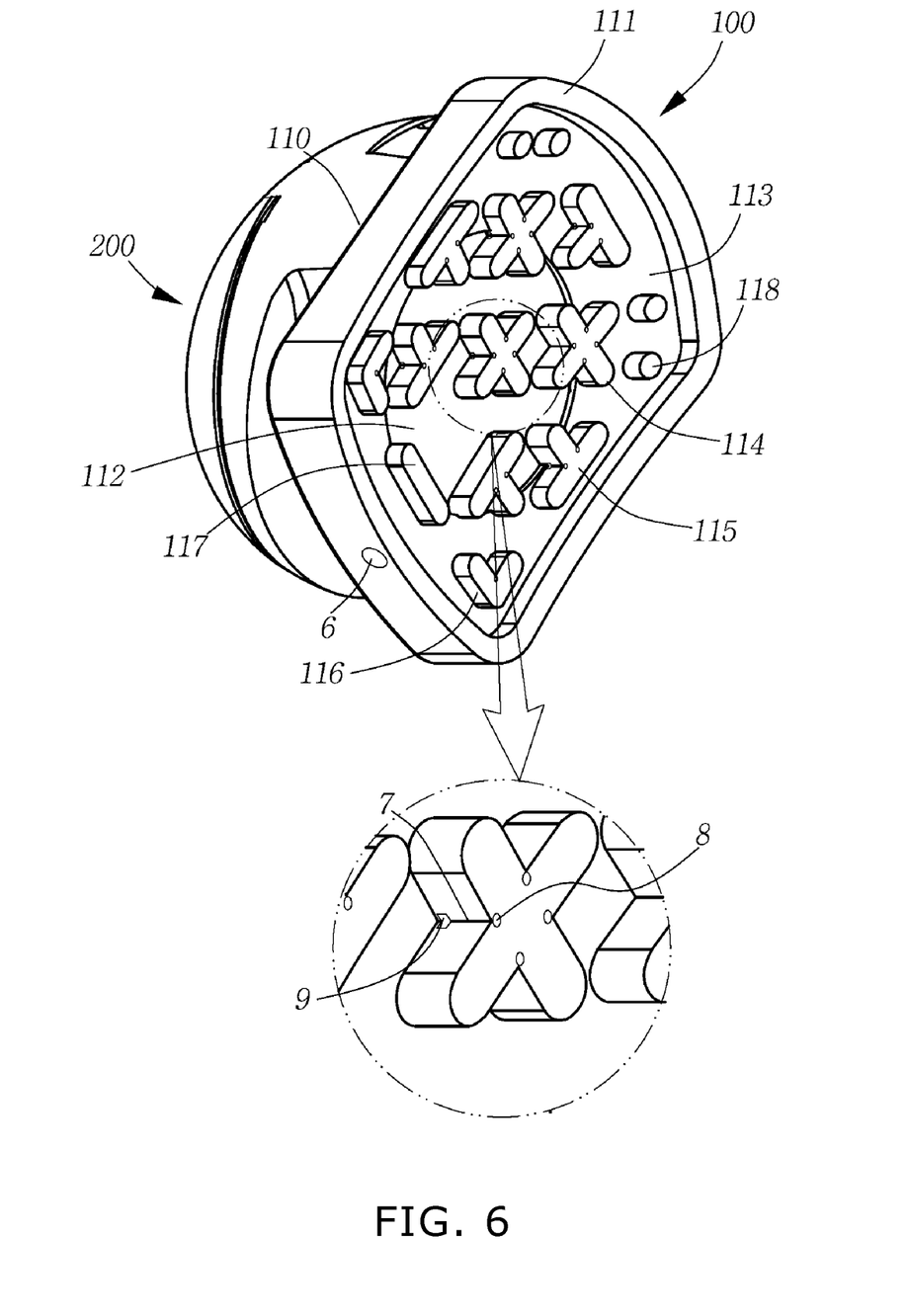
FIG. 6 is a bottom perspective view showing the self-ligation orthodontic bracket assembly according to the embodiment of the present invention so that the bottom of the base can be viewed.
Figure 7:
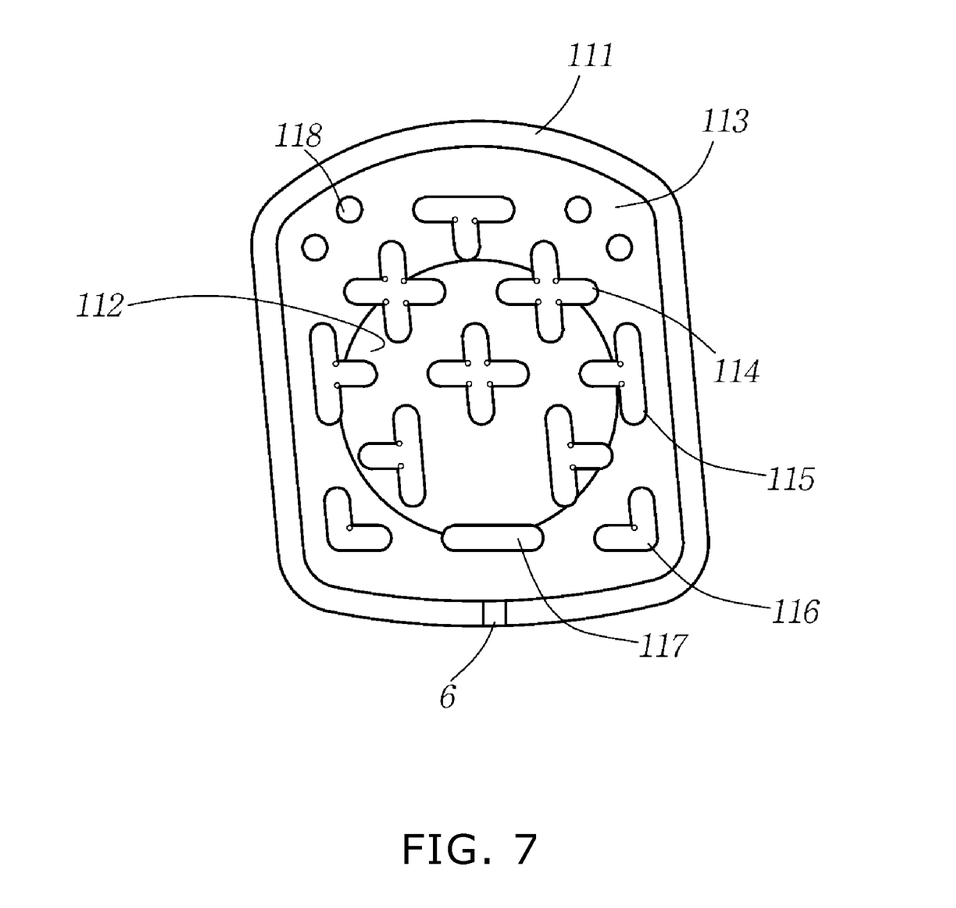
FIG. 7 is a bottom view showing the self-ligating orthodontic bracket assembly according to the embodiment of the present invention.

FIG. 2 is a sectional view showing a state in which the self-ligation of a self-ligating orthodontic bracket assembly according to an embodiment of the present invention is being performed; FIG. 3 is a sectional view showing a state in which the self-ligation of the self-ligating orthodontic bracket assembly according to the embodiment of the present invention has been completed; FIG. 4 is an exploded view showing a ligating block and a retainer separated from the self-ligating orthodontic bracket assembly; FIG. 5 is a plan view of the retainer shown in FIG. 4; FIG. 6 is a bottom perspective view showing the self-ligation orthodontic bracket assembly according to the embodiment of the present invention so that the bottom of the base can be viewed; and FIG. 7 is a bottom view showing the self-ligating orthodontic bracket assembly according to the embodiment of the present invention.

As shown in FIGS. 2 to 7, the self-ligating orthodontic bracket assembly according to the embodiment of the present invention is attached to the surface of a tooth during orthodontic treatment and selectively ligates or releases an archwire W. The self-ligating orthodontic bracket assembly includes a body block 100, a ligating block 200, and a ligating means.

In this case, the body block 100 includes: a base 110 having a curved-shaped bottom surface corresponding to the surface of a tooth so that it can be attached to the surface of a tooth by adhesive resin (or an adhesive) and an archwire W can be seated in a teeth arrangement direction; a pair of guide walls 130 (only a single guide wall 130 is shown) provided on the left and right sides of the front portion of an area above the base 110; and a stopper wall 120 formed in the front portion of the area above the base 110 and configured to finish the sliding portion 131; wherein the pair of guide walls 130 are integrated with the stopper wall 120 so that a single depressed sliding portion 131 is formed in the front portion of the area above the base 110. Although not shown in detail, rail grooves formed along the front and rear directions may be provided on the inner surfaces of the pair of guide walls 130 and 130. Furthermore, a groove 140 configured such that an archwire W having a square or rectangular section is seated therein is formed between an upper front structure, including the pair of guide walls 130 and 130 and the sliding portion 131, and the stopper wall 120.

Meanwhile, the ligating block 200 is slidably coupled to the sliding portion 131 so that the archwire W slidably inserted and seated into the seating groove 140 can be selectively ligated and released in a seated state. The top surface of the ligating block 200 has a shape corresponding to the corner surface of the inner side of the upper end the guide wall 130. When the ligating block 200 is completely engaged with the sliding portion 131 inside the pair of guide walls 130 and 130 and thus ligates the archwire W, the top spherical surface of the ligating block 200 and the outer spherical surface of the body block 100 may be matched with each other to form a larger spherical surface. Both sides of the ligating block 200 are composed of planes that come into slidable contact with the inner surfaces of the pair of guide walls 130.

Meanwhile, the ligating means configured to allow the ligating block 200 to selectively ligate and release the archwire W to and from the body block 100 through a sequential temporary assembly, complete assembly and disassembly process during the sliding coupling of the ligating block 200. In the present embodiment, the ligating means preferably includes a temporary assembly protrusion 135, a complete assembly protrusion 137 and a retainer 300.

More specifically, the temporary assembly protrusion 135 and the complete assembly protrusion 137 are formed to protrude at a predetermined interval on the sliding portion 131 of the body block 100.

Furthermore, the retainer 300 is upwardly fitted and fastened from a location below the ligating block 200 so that the other end is sequentially moved over the temporary assembly protrusion 135 and the complete assembly protrusion 137, caught and supported, and then selectively moved over the complete assembly protrusion 137 and caught and supported on the temporary assembly protrusion 135 while having elasticity and being vertically deformed and returned based on one end, thereby being selectively ligated and released with respect to the archwire W.

In the self-ligation orthodontic bracket assembly according to the present invention, which is configured as described above, in particular, the ligation block 200 is slidingly coupled to the top of the body block 100. In this case, it is important that the retainer 300 is upwardly fitted and fastened from a lower location and fixed and the other end thereof has elasticity and is vertically deformed and returned based on one end thereof.

For this purpose, it is preferable that the bottom of the ligating block 200 is recessed upward to form a fitting depression 250, and a guide depression 260 is formed through upward recessing to form a step at a location a predetermined distance away from one end of the fitting depression 250.

Meanwhile, the retainer 300 is provided as a hollow square plate in which a fastening hole 330 is formed in the center thereof, a stopper piece 350 on one side of the fastening hole 330 is fitted and fastened to a stepped side of the fitting depression 250, and stop flexible pieces 310 on one side of the fastening hole 330 is fitted and fastened to the stepped opposite side of the fitting depression 250. The fitting and fastening is preferably an interference fitting method.

In other words, the retainer 300 in which the stopper piece 350 and the stop flexible pieces 310 are provided on the opposite sides of the fastening hole 330, respectively, is configured to be sequentially moved over the temporary assembly protrusion 135 and the complete assembly protrusion 137 as the stop flexible pieces 310 is selectively deformed elastically and returned toward the guide depression 260.

Although the retainer 300 is inserted and coupled into the fitting depression 250 by an interference fitting method, there is a possibility that the retainer 300 may be separated until the ligating block 200 to which the retainer 300 is coupled is slidably coupled to the sliding portion 131 of the body block 100. In the state where the ligating block 200 is slidably coupled to the sliding part 131 and rail protrusions on the side of the ligating block 200 are slidably inserted into rail grooves formed on the pair of guide walls 130, there is no concern that the retainer 300 may be separated. Accordingly, in the present embodiment, there is provided an adhesive film 2 configured to attach and maintain the retainer 300 to the bottom surface of the ligating block 200 until the ligation block 200 is slidably coupled to the sliding portion 131. The adhesive film 2 is attached to the bottom surface of the ligating block 200 while covering the retainer 300 to more reliably maintain the retainer 300 in the fitting depression 250 of the ligating block 200. Meanwhile, a cutting edge 3 is formed on the sliding portion 131, so that when the ligating block 200 to which the retainer 2 is coupled slides on the sliding portion 131, the adhesive film 2 is cut in the longitudinal direction thereof, and thus the retainer 300 can play the original role thereof as described above. The adhesive film 2 cut into two pieces is in a state in which the pieces may be easily removed.

In the self-ligating orthodontic bracket assembly according to the present invention, which is configured as described above, in particular, the temporary assembly protrusion 135 guides the stop flexible pieces 310 of the retainer 300 through moving over the parts during sliding for the ligation of the wire (W) through the sliding coupling of the ligation block 200 to the body block 100. At the same time, when the ligating block 200 slides in reverse for the purpose of the release of the ligation, it is important to ensure that the stop flexible pieces 310 of the retainer 300 is caught and supported.

Accordingly, it is preferable that an inclined surface portion 135a is formed on one side of the temporary assembly protrusion 135 and a vertical surface portion 135b is formed on the other side of the temporary assembly protrusion 135.

Additionally, it is preferable that inclined surface portions 137a and 137b are formed on both sides of the complete assembly protrusion 137 so that the stop flexible pieces 310 of the retainer 300 is guided through moving over it during sliding for the ligation of the archwire W through the sliding coupling of the ligating block 200 to the body block 100 and the release of the ligation.

It is preferable that, in particular, the complete assembly protrusion 137 is formed to be inclined such that the inclined surface portion 137a on the side on which the stop flexible pieces 310 is caught and supported after being moved over it has a larger slope than the inclined surface portion 137b opposite thereto. Through this, the stop flexible pieces 310 that is caught and supported on the inclined surface portion 137a after being moved over it can be moved over it in the reverse direction only when a force of a predetermined load or higher is applied.

Meanwhile, in the self-ligation orthodontic bracket assembly according to the present invention as described above, it is preferable that the stop flexible pieces 310 of the retainer 300 are formed as a pair of pieces by a dividing hole 320 formed in the middle of the stop flexible pieces 310 over a predetermined length.

In other words, the stop flexible pieces 310 are formed as a pair of pieces in such a manner that a dividing hole 320 is formed in the middle of the stop flexible pieces 310 over a predetermined length, and thus elastic deformation and return may be achieved with only a small amount of force in the process in which the stop flexible pieces 310 of the retainer 300 is moved over the temporary assembly protrusion 135 and the complete assembly protrusion 137. During the above-described sliding, collision or interference does not occur between the cutting edge 3 and the retainer 300 due to the dividing hole 320.

Moreover, it is important to the self-ligation orthodontic bracket assembly according to the present invention, which is configured described above, that the body block 100 is securely attached to the surface of a tooth when attached to the surface of the tooth.

Accordingly, the body block 100 has a curved surface corresponding to the surface of a tooth as the surface of the body block 100 that is bonded to the surface of the tooth, i.e., the bottom surface of the base 110, in order to increase an attachment area when the body block 100 is attached to the surface of the tooth surface.

The bottom portion of the body block 100, more specifically the bottom surface of the base 110, has an edge portion 111, a central recessed portion 112 formed in the center of an area inside the edge portion 111, and a peripheral recessed portion 113 formed in the peripheral portion of the area inside the edge portion 111, i.e., between the edge portion 111 and the central recessed portion 112. The central recessed part 112 and the peripheral recessed portion 113 form a double step structure on the bottom surface of the base 110.

The recession depth of the central recessed portion 112 is larger than that of the peripheral recessed portion 113. When the self-ligating orthodontic bracket assembly is attached to the surface of a tooth by interposing resin between the bottom surface of the base 110 and the surface of the tooth, the resin between the base and the surface of the tooth is compressed by pressing the self-ligating orthodontic bracket assembly against the surface of the tooth. The resin is compressed to the smallest in the central recessed portion 112 having the largest recession depth.

When the double step structure is not applied, there is a high possibility that the peripheral region of the base is separated from the surface of a tooth because the adhesion strength of the peripheral region of the base with the surface of the tooth is small, whereas the adhesion strength of the central region with the surface of the tooth unnecessarily increases. Accordingly, when the self-ligating orthodontic bracket assembly is separated from the surface of a tooth, the surface of the tooth may be damaged.

However, according to the present embodiment, the adhesion strength is relatively reduced because the resin is less compressed in the central depressed portion 112, whereas the adhesion strength is relatively increased because the resin is more compressed in the outer depression 113. Accordingly, the adhesion strength for the surface of a tooth may be more uniform over the overall area of the bottom surface of the base 110.

Furthermore, the bottom surface of the base 110 includes a plurality of adhesion protrusions 114, 115, 116, 117 and 118 protruding from the bottom of the central recessed portion 112 or the bottom of the peripheral recessed portion 113 while being located inside the edge portion 111. Each of the plurality of adhesion protrusions 114, 115, 116, 117 and 118 includes a adhesion surface corresponding to the surface of a tooth, and resin is interposed between the adhesion surface of each of the adhesion protrusions 114, 115, 116, 117 and 118 and the surface of a tooth. As described above, resin is also interposed between the bottom surface of the edge portion 111 and the surface of the tooth.

Conventionally, since the adhesion protrusions having the same shape (pattern) are regularly formed on the bottom of the base in a specific pattern regardless of the curved shape of the surface of a tooth, it was rather difficult to obtain a uniform adhesion strength. According to the present invention, the adhesion protrusions 114, 115, 116, 117 and 118 having various shapes (patterns) are irregularly provided on the bottom of the base 110 according to various conditions in order to obtain uniform adhesion strength in response to various conditions such as tooth surface conditions.

In the present embodiment, the plurality of adhesion protrusions 114, 115, 116, 117 and 118 includes: one or more cross-shaped adhesion protrusions 114 where four straight portions meet approximately 90 degrees; one or more T-shaped adhesion protrusions 115 where three straight portions meet at approximately 90 degrees; one or more L-shaped adhesion protrusions 116 where two straight portions meet at approximately 90 degrees; and one or more I-shaped adhesion protrusions 117 each of which is composed of only one straight portion; and one or more dot-shaped adhesion protrusions 118 each of which has a circular or square cross section. The cross-shaped adhesion protrusions 114 are significantly advantageous in uniformly distributing the resin in a region where the adhesion conditions are relatively uniform because the resin is uniformly distributed in the regions divided into four equal areas by the four straight portions. There may be adhesion protrusions where straight parts meet at an angle other than 90 degrees. In this case, there is no problem in the region where the angle between two straight portions exceeds 90 degrees, but a region where the angle between the two straight portions is smaller than 90 degrees occurs. In this area, a disadvantage arises in that it is difficult to supply resin desirably up to the corner where straight portions meet due to the surface tension of the resin. The T-shaped adhesion protrusion 115 and the L-shaped adhesion protrusion 116 may be provided in a region where it is difficult to apply the cross-shaped adhesion protrusion 114. In the case of the T-shaped adhesion protrusion 115 and the L-shaped adhesion protrusion 116, the angle at which straight portions meet is also determined to be 90 degrees, and this is to ensure that the resin is uniformly supplied to a corner. The I-shaped adhesion protrusion 117 and the dot-shaped adhesion protrusion 118 are complementarily applied and may be omitted.

In orthogonal adhesion protrusions such as the cross-shaped adhesion protrusion 114, the T-shaped adhesion protrusions 115 and the L-shaped adhesion protrusions 116, an inner cross corner 7 and an outer cross corner is formed in an area where two straight portions meet. In this case, it is difficult to smoothly supply resin up to a corner region where the inner crossing edge 7 meets the bottom of the central recessed portion 112 or the bottom of the peripheral recessed portion 113. Accordingly, resin inlet holes 8 are formed in the bottom surfaces of the orthogonal resin adhesion protrusions such as the cross-shaped adhesion protrusions 114, the T-shaped adhesion protrusions 115 and the L-shaped adhesion protrusions 116, i.e., in adhesion regions. The resin inlet holes 8 extend to a resin outlet hole 9 that is formed adjacent to a point where the inner cross corner 7 and the bottom of the central or peripheral recessed portion 112 and/or 113 meet. When the base 110 of the body block 100 is attached to the surface of a tooth by resin, the resin interposed between the bottoms surface of the cross-shaped adhesion protrusion 114, the T-shaped adhesion protrusion 115, and the L-shaped adhesion protrusion 116, i.e., the adhesion surfaces, and the surface of the tooth is introduced through the resin inlet holes 8 and supplied to the vicinity of the corner where the inner cross corner 7 and the bottom of the central and/or peripheral recessed portion 112 and/or 113 meet through the resin outlet 9. It may be possible to smoothly supply the resin to the corner area where it was difficult to supply resin due to the shape. In addition, the resin inlet holes 8 may serve to increase the adhesion force between the base 110 and the surface of a tooth.

Furthermore, there is further formed a resin outflow/inflow passage 6 extending from the outer surface of the edge portion 111 to the inner surface of the edge portion 111. The resin outflow/inflow passage 6 makes it possible to check whether there is a leakage of resin through the resin outflow/inflow passage 6 when the base 110 of the body block 100 is attached to the surface of a tooth. If there is a resin leakage, it is determined that the amount of resin supplied is sufficient. However, when there is no resin leakage, the amount of resin is insufficient, and the resin may be additionally supplied through the resin outflow/inflow passage 6. When the area of the base 110 is divided into an area adjacent to the resin inflow/outflow passage 6 and an area opposite the resin inflow/outflow passage 6, the density of the adhesion protrusions 114, 115, 116, 117 and 118 in the area adjacent to the resin inflow/outflow passage 6 is preferably low. This helps the resin be additionally supplied smoothly. Furthermore, it is preferable that the depth of the resin outflow/inflow passage 6 and the outermost peripheral recessed portion 113 is greater than the depth of the remaining peripheral recessed portion 113 and the depth of the peripheral recessed portion 113 opposite the resin outflow/inflow passage 6 is the lowest.

According to the present invention, there is provided the orthodontic bracket assembly that facilitates ligation and allows an optimal amount of resin to be sufficiently interposed between the base of a body block and the surface of a tooth in a uniform distribution, so that the orthodontic bracket assembly can be securely and reliably attached to a tooth and also be separated from the surface of the tooth without damage to the surface of the tooth.

Although the specific embodiments of the present invention have been described in detail above, the present invention is not limited thereto, and the present invention may be implemented in various modifications by those of ordinary skill in the art. Such modifications are also included within the scope of the present invention.

What is claimed is:

1. A self-ligating orthodontic bracket assembly, the self-ligating orthodontic bracket assembly adapted to be attached to a surface of a tooth by resin and selectively ligating or releasing an archwire, the self-ligating orthodontic bracket assembly comprising:

a body block including, in an integrated manner, a base provided with a bottom surface having a curved surface shape corresponding to a surface of a tooth, a pair of guide walls provided on left and right sides of a front portion of an area above the base so that a depressed sliding portion in which a seating groove configured such that an archwire is seated therein is formed is formed in the front portion of the area above the base, and a stopper wall formed in a rear portion of the area above the base and configured to finish the sliding portion;

a ligating block configured to be slidably coupled to the sliding portion so that the archwire slidably inserted and seated into the seating groove is selectively ligated and released in a seated state, and provided with a fitting depression formed by recessing a bottom of the ligating block upward and a guide depression formed through upward recessing to form a step at a location a predetermined distance away from one end of the fitting depression; and a ligating means including a temporary assembly protrusion and a complete assembly protrusion successively formed on the sliding portion, and a retainer configured to selectively ligate and release the archwire in cooperation with the temporary assembly protrusion and the complete assembly protrusion;

wherein the retainer is formed in a shape of a hollow square plate in which a fastening hole is formed in a center thereof, a stopper piece on one side of the fastening hole is configured to be fitted and fastened into the fitting depression, and a stop flexible pieces on an opposite side of the fastening hole is divided into a pair of pieces by a dividing hole in a middle of the stop flexible pieces;

wherein, when the ligating block slides and proceeds on the sliding portion, the stop flexible pieces are sequentially moved over the temporary assembly protrusion and the complete assembly protrusion while being elastically deformed downwards and returned upwards toward the guide depression; and wherein a bottom surface of the base includes an edge portion, a central recessed portion formed in a center of an area inside the edge portion, a peripheral recessed portion formed in a peripheral portion of the area inside the edge portion and configured to form a double step structure along with the central recessed portion, and a plurality of adhesion protrusions protruding from a bottom of the central recessed portion or a bottom of the peripheral recessed portion, the plurality of adhesion protrusions include one or more cross-shaped adhesion protrusions where four straight portions meet approximately 90 degrees, one or more T-shaped adhesion protrusions where three straight portions meet at approximately 90 degrees, and one or more L-shaped adhesion protrusions where two straight portions meet at approximately 90 degrees; and a depth of recession of the central recessed portion is larger than that of the peripheral recessed portion so that with respect to resin between the bottom surface of the base and the surface of the tooth, resin in a central region is less compressed than resin in a peripheral region.

2. The self-ligating orthodontic bracket assembly of claim 1, further comprising an adhesive film attached to a bottom surface of the ligating block while covering the retainer and configured to attach and maintain the retainer to the bottom surface of the ligating block until the ligation block is slidably coupled to the sliding portion, wherein a cutting edge configured to cut the adhesive film in a longitudinal direction thereof when the ligating block to which the retainer is coupled slides on the sliding portion is formed on the sliding portion.

3. The self-ligating orthodontic bracket assembly of claim 1, wherein an inner cross corner and an outer cross corner are formed in an area where two straight portions meet in the cross-shaped adhesion protrusions, the T-shaped adhesion protrusions, and the L-shaped adhesion protrusions, resin inlet holes are formed in bottom surfaces of the cross-shaped adhesion protrusions, the T-shaped adhesion protrusions and the L-shaped adhesion protrusions and extend to a resin outlet hole that is formed adjacent to a point where the inner cross corner and a bottom of the central or peripheral recessed portion meet, and a resin outflow/inflow passage is formed in the edge portion to extend from an outer surface of the edge portion to an inner surface of the edge portion.

* * * * *